US007321212B2

(12) United States Patent
Lewis

(10) Patent No.: US 7,321,212 B2
(45) Date of Patent: Jan. 22, 2008

(54) RESTRICTED MOTION MOTOR CONTROL WITH VISUAL INDICATION

(75) Inventor: Clarence A. Lewis, deceased, late of Casco, ME (US); by Dina M. Lewis, legal representative, Casco, ME (US)

(73) Assignee: Innovative Motor Controls Inc., Waltham, MA (US)

( * ) Notice: Subject to any disclaimer, the term of this patent is extended or adjusted under 35 U.S.C. 154(b) by 0 days.

(21) Appl. No.: 11/344,865

(22) Filed: Feb. 1, 2006

(65) Prior Publication Data

US 2007/0194739 A1 Aug. 23, 2007

(51) Int. Cl.
*H02P 3/00* (2006.01)

(52) U.S. Cl. ...................... 318/469; 318/468; 318/466; 318/266; 318/369; 101/257; 101/37; 101/35

(58) Field of Classification Search ............... 318/469, 318/468, 466, 266, 369; 101/248, 482, 486, 101/35, 257, 37
See application file for complete search history.

(56) References Cited

U.S. PATENT DOCUMENTS

| | | | | | |
|---|---|---|---|---|---|
| 2,922,633 | A | | 1/1960 | Gray | |
| 2,963,965 | A | | 12/1960 | Baumgartner | |
| 3,601,046 | A | * | 8/1971 | Motter | 101/247 |
| 3,717,092 | A | * | 2/1973 | Crum | 101/248 |
| 4,177,730 | A | * | 12/1979 | Schriber et al. | 101/248 |
| 4,223,453 | A | * | 9/1980 | Meyer | 434/219 |
| 4,283,731 | A | * | 8/1981 | Bok et al. | 347/4 |
| 4,603,336 | A | * | 7/1986 | Dufour et al. | 346/74.2 |
| 4,811,939 | A | * | 3/1989 | Keith | 271/146 |
| 4,841,855 | A | * | 6/1989 | Marcum | 101/148 |
| 5,001,950 | A | * | 3/1991 | Fokos et al. | 83/37 |
| 5,076,164 | A | * | 12/1991 | Becker | 101/183 |
| 5,893,557 | A | * | 4/1999 | Beduhn et al. | 271/228 |
| 6,418,827 | B1 | | 7/2002 | Bussey, III et al. | |

* cited by examiner

*Primary Examiner*—Rita Leykin
(74) *Attorney, Agent, or Firm*—Hamilton, Brook, Smith & Reynolds, P.C.

(57) ABSTRACT

A visual indication for a motor controlled shaft, especially useful for retrofitting hand controlled printing presses.

6 Claims, 3 Drawing Sheets

RESTRICTED MOTION MOTOR CONTROL WITH VISUAL INDICATION

FIELD OF THE INVENTION

The general field of the disclosed invention relates to the control of motors that have applications requiring adjustable limit switches for restricted motion with visual indication of position in the range.

BACKGROUND OF THE INVENTION

The vast majority of printing presses were designed and installed before the four color printing process was introduced to the advertising industry. Since the presses were designed to print primarily black ink, the manual register mechanisms were equipped with hand wheels that the operator adjusted manually when ever needed.

With the advent of four color printing and with the demand for quality color register, the hand wheels must be adjusted frequently throughout the entire run. With the introduction of color printing, the operators' task of adjusting the many hand wheels has become very difficult, as each four color printed web has up to 16 hand wheels which are in remote locations, requiring climbing ladders and frequently walking many feet to make the adjustments. Thus, there is an urgent need to motorize the hand wheels so that the operator can make adjustments without leaving his operator control station. Additionally, with the pressure to increase the quality of color register, automatic register controls can be justified but motors must first be installed.

DESCRIPTION OF THE PRIOR ART

All of the attempts to add motors to existing hand wheels had classical designs that have included adding motors and gear heads mounted with brackets and/or flexible couplings, all requiring extensive modifications to the printing machine and its guards.

SUMMARY OF THE INVENTION

The objects of this invention is to provide a motor gearbox design that includes adjustable limit switches that are integral to the motor that greatly simplifies the installation of motors on restricted motion mechanical mechanisms, such as found on the Metro, Urbanite, and Community newspaper presses, manufactured by the Goss company, formerly of Chicago Ill.

EXEMPLARY ADVANTAGES

The design of the motor gearbox incorporate a simple and inexpensive lead screw design which provide a number of advantages.

The following list details some of the advantages possible in some of the preferred embodiments of the present invention:

1. The lead screw provides a low profile and size enabling compact design of adjustable limit switches for restricted range applications
2. The lead screw enables the incorporation of a visual indication of the position of the mechanism within its range.
3. The Motor Control is designed to employ the Quick Disconnect invention filed concurrently with this patent application, as U.S. patent application Ser. No. 11/344,867 on Feb. 1, 2006.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
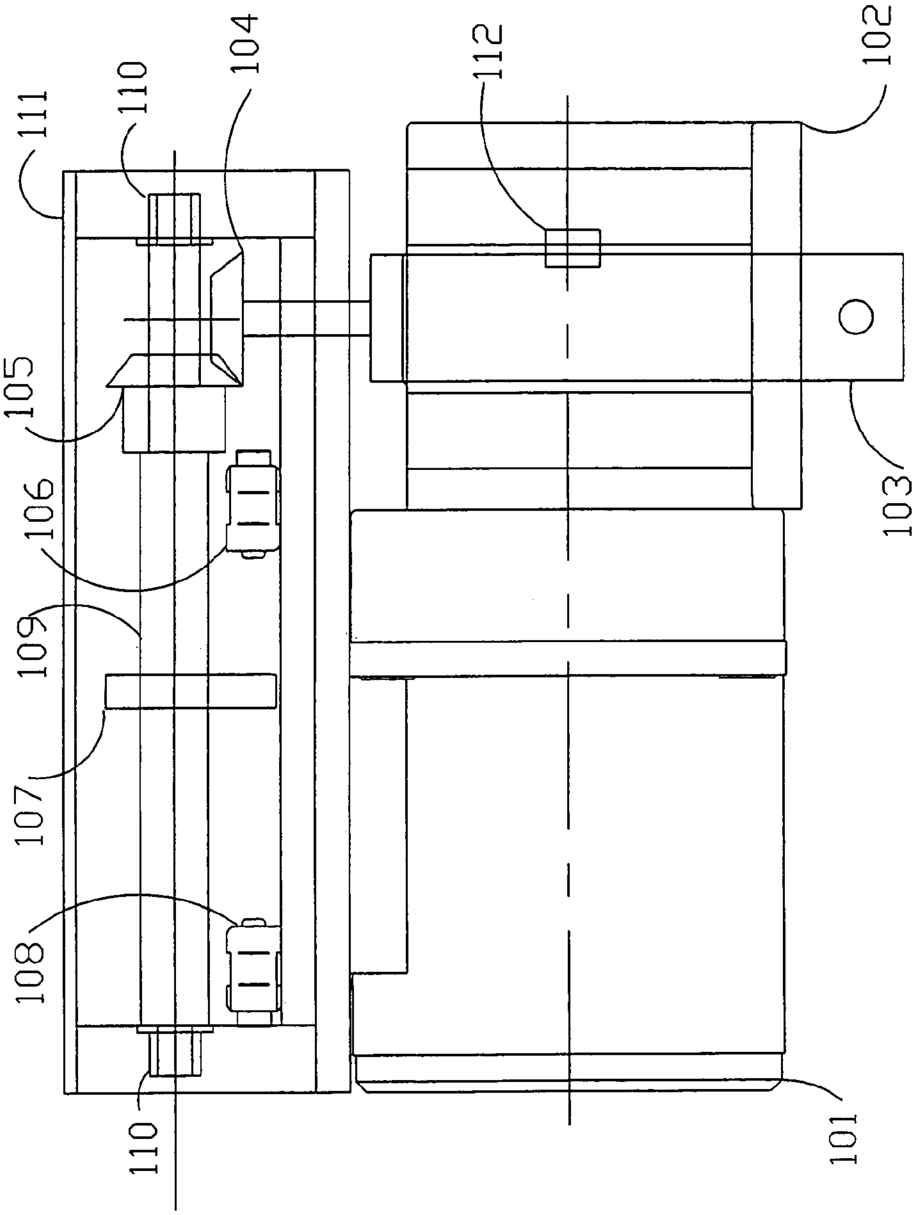
FIG. 1 is a drawing of a side view of the invention

FIG. 1 is a side view of the invention where motor 101 is coupled to the hollow shaft gearbox 102, both manufactured by Oriental Motors of Japan as reversible two phase induction motors. Shaft 103 is attached via a keyed shaft and pin arrangement, to a hand wheel (not shown) that is used to adjust a position of a printing plate. The shaft and pin are described in more detail in a co-pending U.S. patent application entitled "Quick Disconnect for Motor Mount" filed on Feb. 1, 2006 as U.S. patent application Ser. No. 11/344,867 and incorporated by reference in its entirety. Shaft 103 goes through gearbox 102 and is retained by the hollow shaft via key 112. The end of the shaft 103 connects to miter gear 104 which in turn drives miter gear 105. Miter gear 105 is pinned to threaded shaft 109. Thus when shaft 103 turns, threaded shaft 109 will turn one to one with shaft 103. Tab 107 is threaded with the same thread as shaft 109 so that tab will move to the left or the right depending upon the direction of shaft 103.

If tab 107 moves to the left, it will eventually actuate limit switch 108 and will stop the motor. If tab 107 moves to the right it will eventually actuate limit switch 106 and will stop the motor. Both limit switches 108 and 106 can be adjusted for any range from less than one revolution of shaft 103 to many revolutions. Bearings 110 are lubricated bronze bearings that support lead screw 109.

Figure 2:
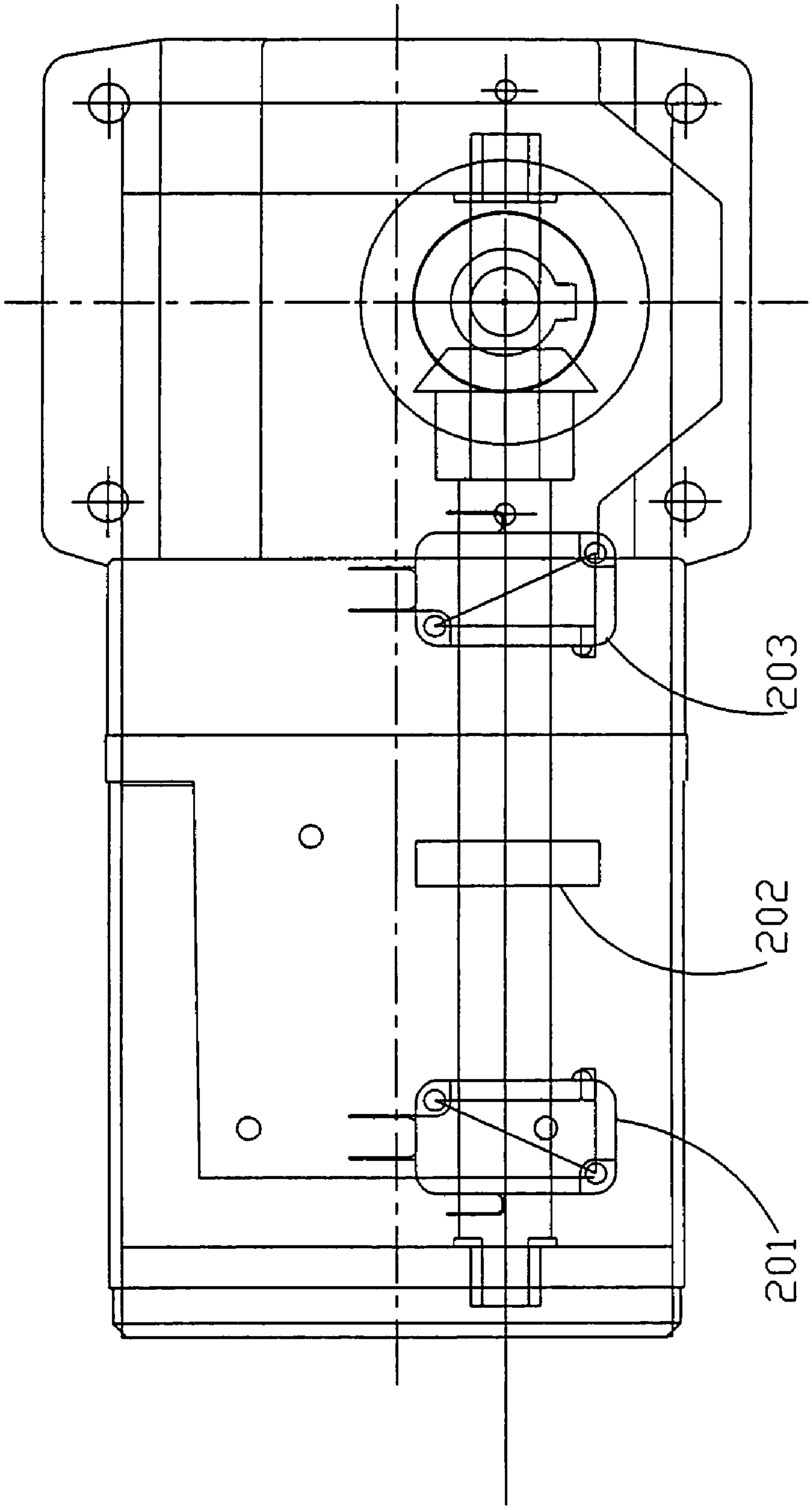
FIG. 2 is a drawing of the top view of the invention

FIG. 2 is a top view of the invention without the cover and shows in more detail the two limit switches 201 and 203, which were 108 and 106 of FIG. 1 respectively. It also shows tab 202 and its location to limit switches 201 and 203.

Figure 3:
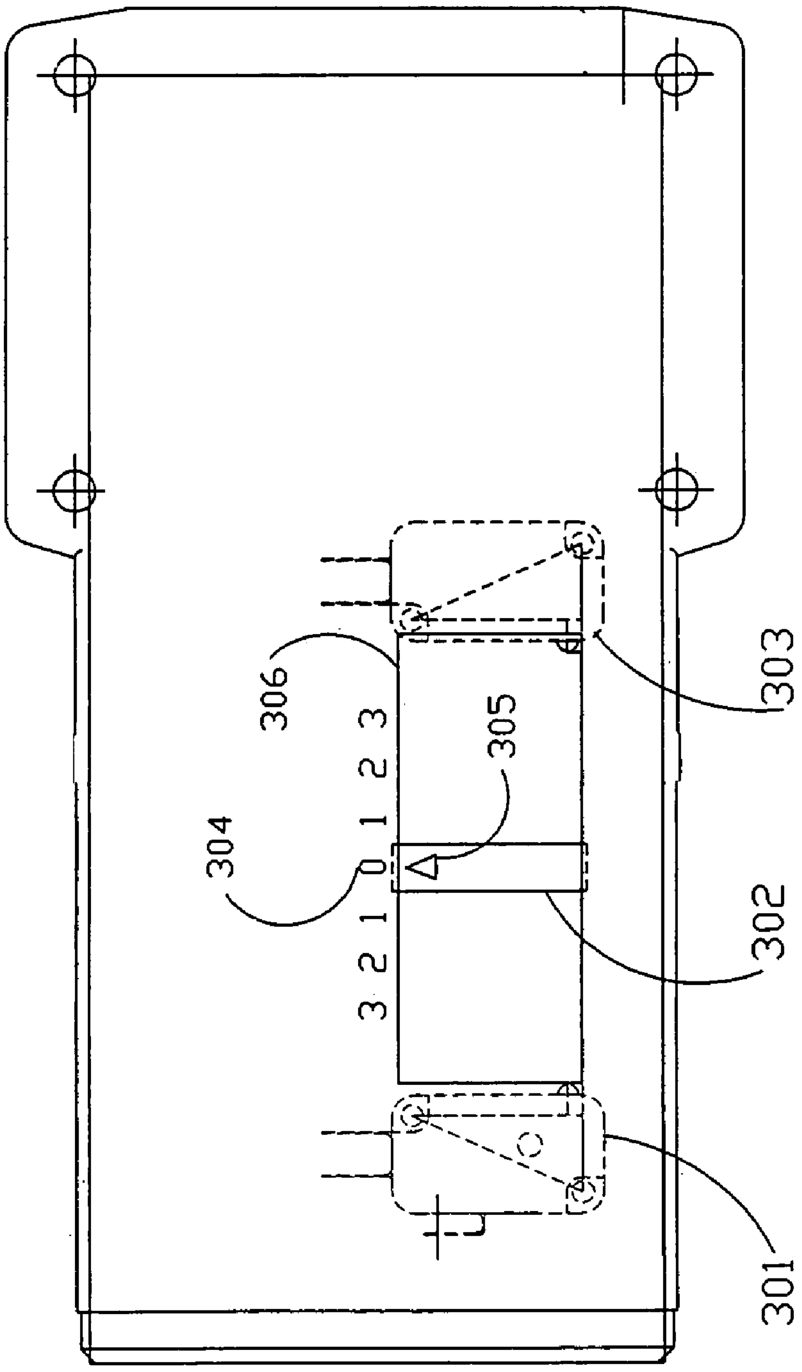
FIG. 3 is a drawing of the top view of the invention showing the calibrated visual display.

FIG. 3 is a view of the invention with the cover on and shows the location of the tab 302 which is 202 of FIG. 2 relative to the calibrated numbers and the position of the mechanism within its range. Since the lead screw is one to one with the mechanisms which in turn are of know lead, the graduations can be easily calibrated relative to each machine. A transparent window 306 allows viewing of tab location and seals the housing against foreign material.

Each motor assembly also includes a toggle switch which enables the operator to center each mechanism by centering tab 302 to zero in the scale.

In the Metro Press, each hand wheel includes a graduated scale within the center of the hand wheel. Normally this valuable feature would be given up with most applications of motors to this press. This valuable feature can now be retained with the teaching of this invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus comprising:

a motor having a driveshaft;

means for coupling the driveshaft for controlling position of a printing press plate;

at least two limit switches for controlling an extent of movement of the motor;

a shaft position tab indicative of the position of the driveshaft; and a cover for housing the apparatus, the cover having a window through which the shaft position tab can be viewed.

2. An apparatus as in claim 1 additionally comprising:

a position indicative shaft, coupled to the driveshaft, for supporting the shaft position tab thereon.

3. An apparatus as in claim 2 wherein the position indicative shaft is a threaded shaft.

4. An apparatus as in claim 2 wherein the position indicative shaft is coupled to the driveshaft via at least one gear.

5. An apparatus as in claim 2 wherein at least one of the limit switches is controlled by the position indicative shaft.

6. An apparatus as in claim 1 wherein the cover includes printed indicia that reference a location of the position indicative tab.

* * * * *